(No Model.)   3 Sheets—Sheet 1.
F. CHALLONER.
SHINGLE SAW GRINDING MACHINE.
No. 379,632.   Patented Mar. 20, 1888.
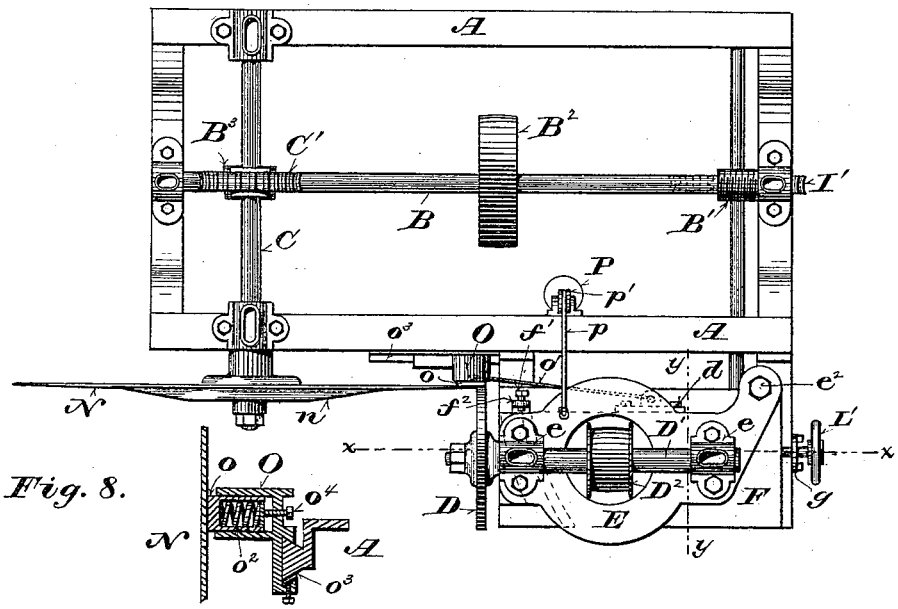
*Fig. 1.*
*Fig. 8.*
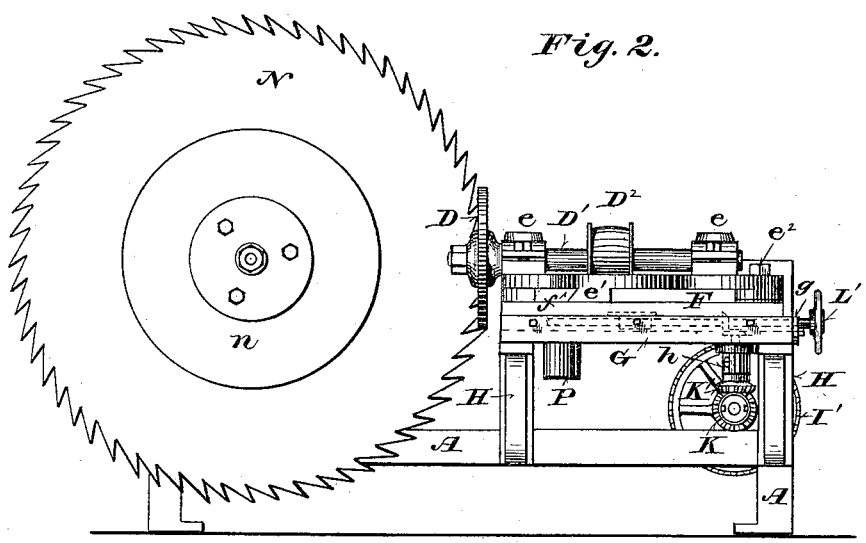
*Fig. 2.*
Witnesses:
Chas. D. Goss
August Lindemann
Inventor:
Frank Challoner
By _____, Attorney.

(No Model.) 3 Sheets—Sheet 2.

F. CHALLONER.
SHINGLE SAW GRINDING MACHINE.

No. 379,632. Patented Mar. 20, 1888.

Witnesses:
Chas. D. Goss
August Lindemann

Inventor:
Frank Challoner
By 
Attorney.

(No Model.) 3 Sheets—Sheet 3.

F. CHALLONER.
SHINGLE SAW GRINDING MACHINE.

No. 379,632. Patented Mar. 20, 1888.

Witnesses:
Chas. L. Goss.
August Lindemann.

Inventor:
Frank Challoner
By C. H. Bottum
Attorney.

United States Patent Office.

FRANK CHALLONER, OF OMRO, WISCONSIN.

SHINGLE-SAW-GRINDING MACHINE.

SPECIFICATION forming part of Letters Patent No. 379,632, dated March 20, 1888.

Application filed November 15, 1886. Serial No. 218,895. (No model.)

*To all whom it may concern:*

Be it known that I, FRANK CHALLONER, of Omro, in the county of Winnebago and State of Wisconsin, have invented certain new and useful Improvements in Shingle-Saw-Grinding Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of my invention is to grind a shingle-saw to a uniform bevel extending from its periphery or base of the teeth toward the center of the saw; and it consists, essentially, of a rotary grinder having an adjustable support, mechanism for moving the grinder laterally and for supporting and rotating the saw to be operated upon by said grinder, and of other features, hereinafter described, and pointed out in the claims.

In the accompanying drawings like letters designate the same parts in the several figures.

Figure 3:
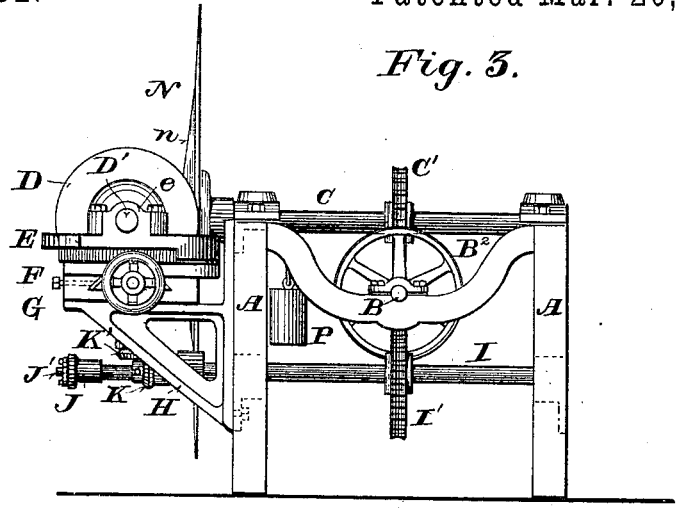
Figure 4:
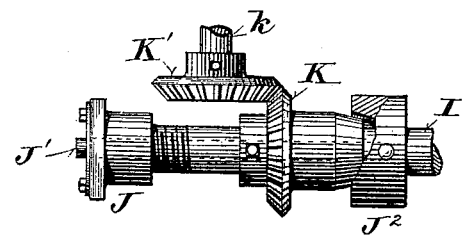
Figure 5:
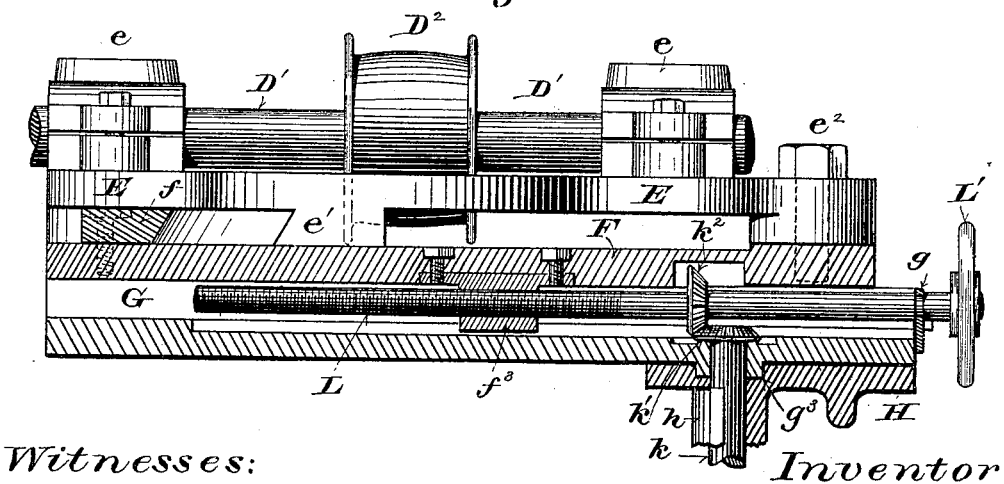
Figure 5:
Figure 6:
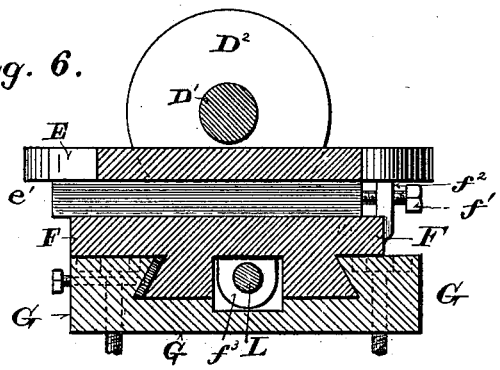
Figure 7:
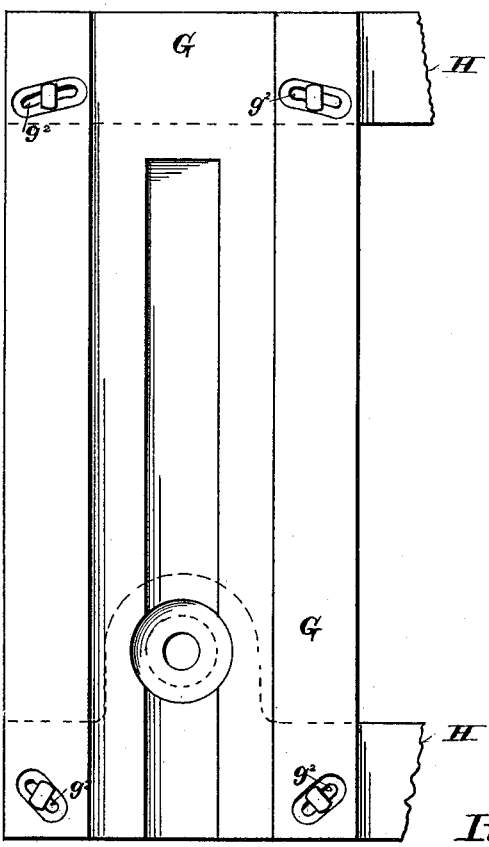

Figure 1 is a plan view of my improved machine. Fig. 2 is a side elevation of the same. Fig. 3 is an end elevation. Fig. 4 is a detached view, on an enlarged scale, of the gears and clutch by which the carriage-feeding screw is controlled and operated. Fig. 5 is a longitudinal section, on an enlarged scale, taken on the line $x\,x$, Fig. 1, of the rotary grinder-carriage and support. Fig. 6 is a transverse section of the same, taken on the line $y\,y$, Fig. 1. Fig. 7 is a plan view of the adjustable carriage-support; and Fig. 8 is a sectional view, on an enlarged scale, of the yielding guide employed to support the saw opposite the rotary grinder.

A represents the frame-work of the machine, formed of any suitable shape and material and provided with suitable bearings for the operative parts of the machine, hereinafter described.

C is a transverse shaft provided with a worm-gear, C', and at one end with a suitable device for securing the saw N thereto and holding it in the proper position to be operated upon by the emery-wheel D.

B is the driving-shaft of my machine, set at right angles to shaft C and provided with the driving-pulley $B^2$ and worm $B^3$, working with the worm-gear C', and with the worm B', which works with a similar worm-gear, I', on the transverse shaft I, supported in bearings provided therefor in frame A and arranged to feed the emery-wheel D laterally toward the eye of the saw N. The emery-wheel D is mounted upon a shaft, D', which is provided with flanged driving-pulley $D^2$, and is supported and works in bearings $e\,e$, provided therefor on the plate E, which is in turn supported upon and pivoted to the carriage F at $e^2$.

The carriage F is formed on its under face, as shown in Figs. 5 and 6, with a longitudinal dovetailed tongue arranged to work in a similar groove formed in the carriage-support G, which rests upon brackets H H, secured to the adjacent side of the frame A, as shown in Figs. 2 and 3.

The carriage F is longitudinally grooved through its dovetailed tongue to receive the feeding-screw L, which works in a nut, $f^3$, secured to said carriage, and is provided with a beveled gear, $k^2$, working with a similar gear, $k'$, secured to the upper end of the vertical shaft $k$, which bears in a hub, $g^3$, formed upon the carriage-support G, and in a box, $h$, formed upon the adjacent bracket, H, as shown in Figs. 2, 5, and 6. The screw L is provided at the end protruding from said carriage with a hand-wheel, L', and has an annular groove adjacent thereto in which the plate $g$, attached to the carriage-support G, works, thereby preventing the endwise movement of said screw with reference to said carriage-support, as shown in Fig. 5. To the lower end of said shaft $k$ is secured the bevel-gear K', working with a similar gear, K, loosely mounted upon shaft I and formed with a conical hub arranged to be engaged by the cup friction-block $J^2$. The adjacent end of shaft I is bored out and a rod, J', inserted therein and secured at its inner end by a transverse bolt or pin passing through lateral slots in said shaft I to said friction-block $J^2$. At its protruding end said rod J' has a fixed bearing in the nut J, threaded upon the end of said shaft I and arranged to move said friction-block $J^2$ lengthwise upon shaft I into and out of engagement with the conical hub of gear K. The hub $g^3$ on the under side of the carriage-support G has a bearing in a recessed projection or ear formed therefor on bracket H, and permits of the adjustment of said carriage-support about the vertical shaft $k$ as a center and the variation of the inclination of the line of travel of carriage F to the plane of saw N. Said carriage-support G is secured in place when properly adjusted by means of bolts tapped into brackets H H and passing through curved slots $g^2$ $g^2$, formed in said carriage-support G, as shown in Fig. 7.

The plate E is formed on its under side with a curved dovetailed tongue, $e'$, arranged to work with a similarly-shaped gib, $f$, adjustably secured by means of bolts to the carriage F, as indicated by dotted lines in Fig. 5, so as to take up wear between the working-faces of said gib and tongue. A weight, P, attached to the plate E by means of a cord or chain, $p$, passing over a pulley, $p'$, on frame A, tends to swing the said plate E about its pivot $e^2$ toward the saw N and to hold the face of the emery-wheel D in contact therewith, as shown in Fig. 1. The movement of said plate E and emery-wheel D toward the saw may be limited as desired by means of the set-bolt $f'$, tapped into the ear, $f^2$ formed on carriage F, as shown in Fig. 1.

$o$ represents a guide fitted into a cylindrical support, O, having a grooved shoe arranged to slide horizontally parallel to the plane of the saw N upon a dovetailed way, $o^3$, formed therefor on the frame A. A rod, $o'$, connects the guide-support O with the carriage F, as shown in Fig. 1, thus causing said guide to travel with the lateral movement of the emery-wheel D along the face of saw N. By means of a screw, $o^4$, tapped into the guide-support O and bearing against a spring, $o^2$, interposed between it and the guide $o$, a yielding and adjustable pressure against the face of the saw is attained.

My improved machine operates as follows: The saw N having been first secured in the proper position on shaft C, the carriage-support G is adjusted by swinging it about the shaft $k$ to produce the desired bevel on the saw, and the bolt $f'$ adjusted to limit the movement of the emery-wheel toward the saw at the proper point. The machine is then set in motion through pulleys $B^2 D^2$, the emery-wheel having been previously set by means of the screw L just inside of the teeth of the saw, (when a saw which has been set is to be ground.) The nut J' on shaft I is now turned up and the friction-block $J^2$ brought into engagement with the hub of gear K, thus communicating motion from said shaft I through shaft $k$ and gears $k' k^2$ to the feeding-screw L, which, having a fixed bearing, $g$, in the carriage-support G, and working in the nut $f^3$, secured to carriage F, slowly moves said carriage in a direction slightly inclined to the plane of the saw, thereby causing the emery-wheel D to travel laterally and traverse with its grinding-face a portion of the face of the saw between its teeth and the collar $n$. The weight P retains said emery-wheel in contact with said saw with a uniform pressure balanced on the opposite side of the saw by the guide $o$, properly adjusted thereto by means of the screw $o^4$. The position of the guide $o$ with reference to the adjacent face of the emery-wheel may be changed by moving the coupling-plate $d$, by means of which it is connected with carriage F. While the emery-wheel D is traversing and abrading the face of the saw N, as described, the saw is slowly rotated by means of the worm $B^3$, working with the gear C' on the saw-supporting shaft C.

The various details of my machine may be modified in many ways without departure from the principle of its operation or the spirit of my invention.

I claim—

1. The combination, in a shingle-saw-grinding machine, with a rotary saw-supporting shaft, of a carriage-way capable of angular adjustment with reference to said shaft, a carriage movable upon said way transversely to said shaft, a rotary grinder, and a horizontally-vibrating frame or plate pivoted to said carriage and provided with bearings for the grinder-shaft, substantially as and for the purposes set forth.

2. The combination, in a shingle-saw-grinding machine, with a rotary saw-supporting shaft, of a carriage-way capable of angular adjustment with reference to said shaft, a carriage movable upon said way transversely to said shaft, a rotary grinder, a vibratory grinder-support pivoted at or near one end to said carriage and provided with bearings for the grinder-shaft, a stop on said carriage limiting the vibration of said grinder-support, and a weight connected with said grinder-support and arranged to draw the grinder against the saw, substantially as and for the purposes set forth.

3. The combination, in a shingle-saw-grinding machine, of the saw-supporting shaft C, rotary grinder D, supported in suitable bearings upon the carriage F, adjustable carriage-support G, feeding-screw L, having a fixed bearing with reference to said carriage-support G and working in a nut, $f^3$, formed on or secured to said carriage F, and upright shaft $k$, provided at its upper end with a gear, $k'$, working with a gear, $k^2$, on said screw, substantially as and for the purposes set forth.

4. The combination, in a shingle-saw-grinding machine, of the rotary grinder D, supported in bearings upon the plate E, pivoted to carriage F, adjustable carriage-support G, arranged to be swung about the upright shaft $k$, feeding-screw L, having a fixed bearing with said support G and working in a nut, $f^3$, on said carriage, and gears $k' k^2$, mounted one on said shaft $k$ and the other on the screw L, substantially as and for the purposes set forth.

5. The combination, in a shingle-saw-grinding machine, of a rotary saw-supporting shaft, a carriage-way capable of angular adjustment with reference to said shaft, a carriage movable upon said way transversely to said shaft, a rotary grinder, a vibratory grinder-support provided with bearings for the grinder-shaft and pivoted at or near the end opposite said grinder to said carriage, and curved guide-bearings working together and attached, one to said carriage and the other to said support, one of said guide-bearings being laterally adjustable to take up wear, substantially as and for the purposes set forth.

6. The combination, in a shingle-saw-grinding machine, of the rotary grinder D, supported in suitable bearings upon carriage F, carriage-support G, provided on its under face with a hub, $g^3$, bearing in its supporting-frame or bracket H and arranged to be adjusted about the upright shaft $k$, feeding-screw L, having a fixed bearing with the carriage-support G and working in a nut applied to said carriage F, and gears $k'$ $k^2$, substantially as and for the purposes set forth.

7. The combination, in a shingle-saw-grinding machine, of the saw-supporting shaft C, provided with gear C', driving-shaft B, provided with worms B' B², working, respectively, with gear C', and a gear, I', on counter-shaft I, gear K, mounted on shaft I and working with gear K' on the upright shaft $k$, screw L, working with the grinder-carriage F and provided with a gear, $k^2$, working with a gear, $k'$, on shaft $k$, carriage F, and rotary grinder D, supported in suitable bearings thereon, substantially as and for the purposes set forth.

8. The combination, in a shingle-saw-grinding machine, of a rotary saw-supporting shaft, a carriage way capable of angular adjustment with reference to said shaft, a carriage movable upon said way transversely to said shaft and at the desired inclination to the plane of the saw, a laterally-yielding rotary grinder mounted upon said carriage, a way parallel with and adjacent to the face of the saw, a slide movable upon said way and connected with said carriage, and a yielding support carried by said slide and bearing against the face of the saw opposite said grinder, substantially as and for the purposes set forth.

9. The combination, in a shingle-saw-grinding machine, of the rotary grinder D, supported in suitable bearings upon the carriage F, carriage-support G, feeding-screw L, provided with a hand-wheel, L', and gear $k^2$, shaft I, having the gear K loosely mounted thereon, and the clutch J² and upright shaft $k$, provided with gears $k'$ K', working, respectively, with said gears $k^2$ and K, substantially as and for the purposes set forth.

10. The combination, in a shingle-saw-grinding machine, of a saw-support, a carriage movable transversely thereto, a rotary grinder mounted upon said carriage, a carriage-supporting way adjustable with reference to the plane of the saw, a screw having a fixed bearing in said carriage way or support and working with a nut on said carriage, and a driving-shaft, about which said carriage-way is arranged to swing, geared with said screw, substantially as and for the purposes set forth.

In testimony that I claim the foregoing as my own I affix my signature in presence of two witnesses.

FRANK CHALLONER.

Witnesses:
P. M. WRIGHT,
O. B. MOON.